Patented Jan. 9, 1923.

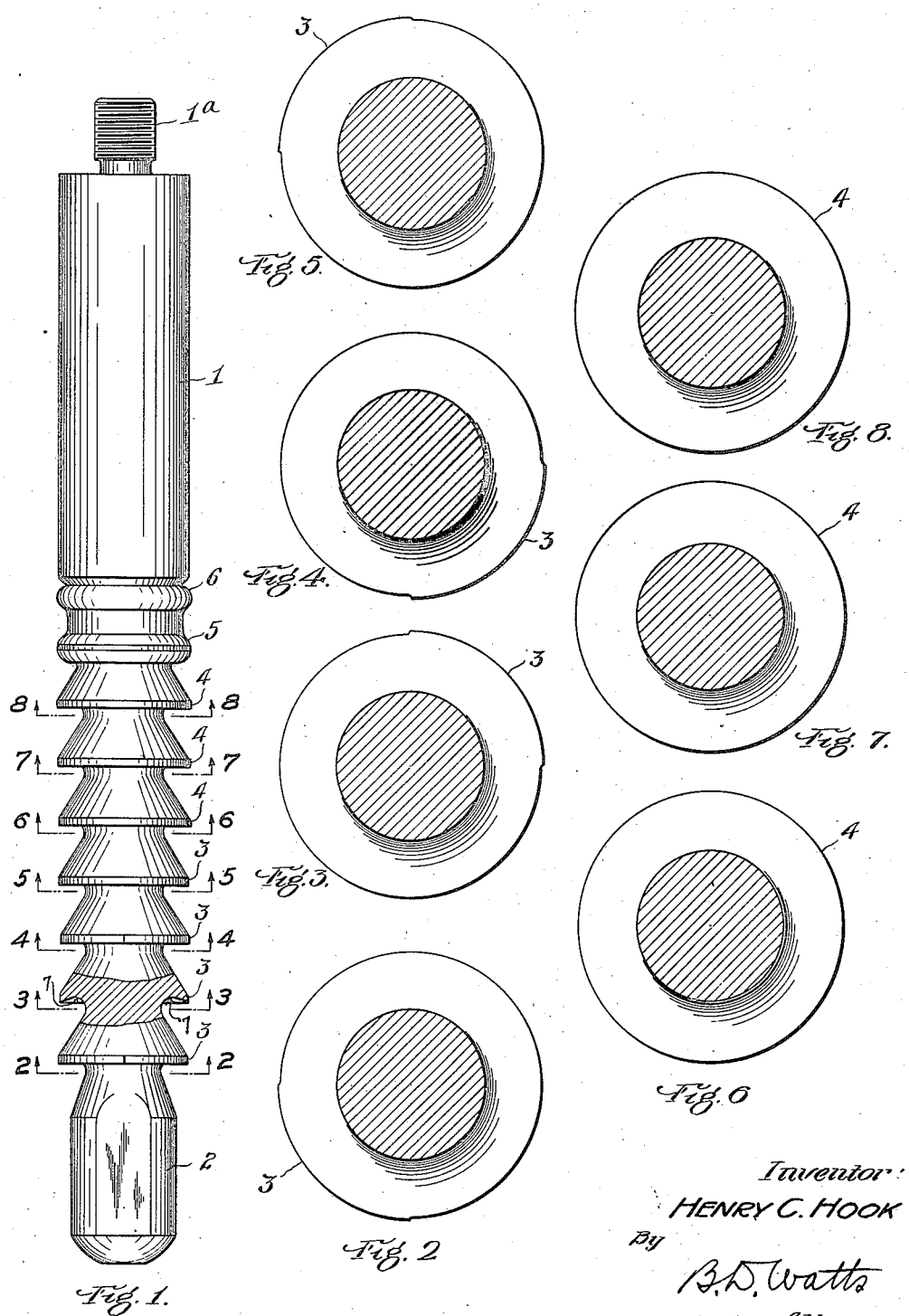

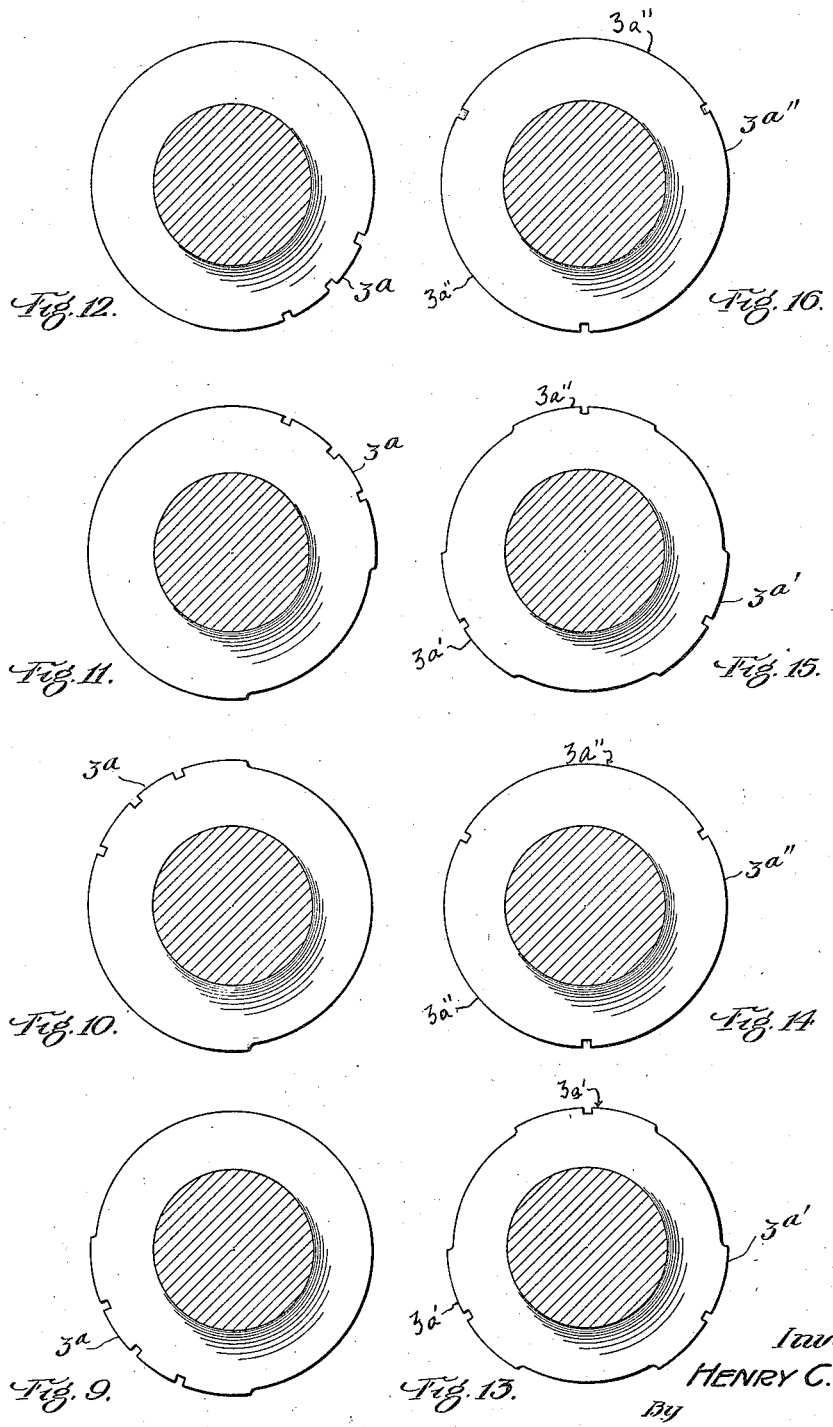

1,441,503

UNITED STATES PATENT OFFICE.

HENRY C. HOOK, OF DETROIT, MICHIGAN, ASSIGNOR, BY MESNE ASSIGNMENTS, TO ALUMINUM MANUFACTURES, INCORPORATED, OF CLEVELAND, OHIO, A CORPORATION OF DELAWARE.

BROACHING TOOL.

Application filed August 13, 1920. Serial No. 403,430.

*To all whom it may concern:*

Be it known that I, HENRY C. HOOK, a citizen of the United States, residing at Detroit, in the county of Wayne, State of Michigan, have invented certain new and useful Improvements in Broaching Tools, of which the following is a specification, reference being had therein to the accompanying drawings.

This invention relates to a tool for broaching the surfaces of composite bearings having their bearing surfaces formed of anti-friction metal, such anti-friction metal ordinarily being relatively soft and backed by harder and stronger metal.

The main object of the present invention is to provide a broach with improved cutters adapted to operate on the lining metal of the bearing with a minimum distortion of the said metal, and without fracturing the crystals, and without subjecting the union between the lining metal and the backing metal to heavy stresses liable to separate said metals.

In the accompanying drawing I show several preferred embodiments of the invention.

Fig. 1 of the drawing is a side elevation of one form of broaching tool embodying my improvments more or less completely.

Figs. 2 to 8, inclusive, are sections on the lines 2—2, 3—3, 4—4, 5—5, 6—6, 7—7, 8—8, respectively, of Fig. 1.

Figs. 9 to 12, inclusive, are transverse sections corresponding to Figs. 2 to 5, inclusive, but showing a modified form of construction.

Figs. 13 to 16, inclusive, are transverse sections corresponding to Figs. 2 to 5, inclusive, but showing another modified form of construction.

Referring first to the broach shown in Figs. 1 to 8, 1 is the shank of the broach which is threaded at 1ª for attachment to the plunger of the press, or to other suitable machine parts. At its lower end the broach is formed with a pilot section 2. Above the pilot section are a series of roughing cutters, 3, 3. The number of these cutters may be varied but in the construction shown there are four. Each of these four cutters is 90 degrees in length, the bottom cutter occupying one quadrant, the second cutter above it being disposed in the opposite quadrant, while the third and fourth cutters are disposed in the remaining opposite quadrants. See Figs. 2, 3, 4, and 5.

Above the roughing cutters 3 are arranged a plurality, preferably three, of finishing cutters 4. These cutters are continuous circular cutters, as shown in Figs. 6, 7, and 8, and are of such size as to take very light cuts which remove crystals that may have been fractured by the roughing cuts.

Above the finishing cutters are burnishing rings 5 and 6.

Adjacent to each of the cutter edges the broach is deeply recessed, as indicated at 7, and this recess is shaped so that the chip, or shaving removed by the cutting edge, naturally, turns or curls away from the edge, and keeps it free to perform its proper function.

In the broaching of bushings it is desirable to make a relatively heavy roughing cut and, with prior forms of broaches, this has resulted in subjecting the lining metal to stresses great enough to distort it, and tear or break its crystals, and to break down the adhesion between the lining metal and the backing metal. This serious difficulty I have obviated by distributing the roughing cut over a series of cutters. Thus in the above described construction what amounts to a single roughing cut is performed by four cutters 90 degrees each, and as these cutters are spaced apart longitudinally of the broach the stresses to which the lining metal is subjected are distributed much more widely through said metal than would be the case if a cut of similar depth were made with a single cutter.

In Figs. 9 to 12 the broach shown has roughing cutters formed as follows: The bottom cutter 3ª, shown in Fig. 9, is slightly over 90 degrees in length, the second cutter shown in Fig. 10, is slightly over 180 degrees in length and occupies the same quadrant as the first cutting edge and an adjacent quadrant, the third cutter, shown in Fig. 11, is slightly over 270 degrees in length, and occupies the same quadrants as the second cutter and an additional quadrant, while the fourth cutter, shown in Fig. 12, has a full circular cutting edge. However, it will be seen that the effective cutting edge of each of the four cutters is but 90 degrees, approximately.

Except for the form of the four roughing cutters this second form of construction is similar to the first form of construction and, as in the first form of construction, the relatively heavy roughing cut is divided between the four cutters so that the resulting stresses are widely distributed through the anti-friction metal of the bearing. In one respect this second construction is preferable to the first form of construction, that is to say each of the roughing cutters is so formed that it has bearing engagement throughout its entire circumference with the wall of the bearing being broached, and accordingly the broach is strongly supported, and adequately guided in its movement.

In the third form of construction shown in Figs. 13 to 16, there are two pairs of roughing cutters. The first or lowermost cutter $3^{a\prime}$ has three cutting edges each 60 degrees in length, and equally spaced apart as shown in Fig. 13. The second cutter has a continuous circular cutting edge $3^{a\prime\prime}$ on the same outside diameter as the first cutter, as shown in Fig. 14. The third and fourth roughing cutters, shown in Figs. 15 and 16 respectively, are similar to the first and second cutters, respectively, except that they are larger in diameter.

This third form of construction, like the second construction, has the advantage of continuous circumferential support for each cutter. Obviously it also serves to distribute the stresses on the lining metal through several cutters, (more or less according to the length of the bearing, and the spacing of the cutters), instead of concentrating it at one cutter as in prior practice.

In each of the three forms of construction, the cutting edges may be interruped, or notched, as indicated in the drawing, for the purpose of breaking up the chip, or shaving, to keep the cutting edges free.

It will be understood that relative diameters of the pilot, cutter and burnisher parts of the broach, as well as their longitudinal spacing will vary with the diameter and length of the bushing to be broached, but in order that my invention may be quite clearly understood some dimensions may be given by way of example.

As an example of the first two types of cutters, the following dimensions are given: Diameter of pilot section 2.087"; diameter of the first four cutters 2.138"; diameter of the fifth cutter 2.143"; diameter of the sixth cutter 2.146"; diameter of the seventh cutter 2.148"; diameter of the first burnisher 2.149"; diameter of the second burnisher 2.1495".

As an illustration of the third type of cutter, the following dimensions are given; diameter of pilot 2.087", diameter of the first two cutters 2.113"; diameter of the second two cutters 2.138"; diameter of the fifth cutter 2.143"; diameter of the sixth cutter 2.146"; diameter of the seventh cutter 2.148"; diameter of the first burnisher 2.1491"; diameter of the second burnisher 2.1495".

The spacing the cutter longitudinally of the broach will vary more or less with the length of the bushing to be broached. Preferably, the distance between cutters will be made less than one half the length of the bushing, so that, after the pilot has left the bushing and before the burnishers have entered, there will never be less than two cutters in the work.

As will be readily understood from the foregoing, various changes as to the relative dimensions, and number of cutters and burnishers, can be made without departing from my invention. The construction shown in the drawing, and the foregoing examples are given by way of illustration and for explanation, the scope of the invention being indicated by the appended claims.

What I claim is:—

1. A broach having a plurality of cutters arranged in different transverse planes and each having an effective cutting edge less than 360 degrees in circumferential length, said cutters, together, being adapted to effect a complete circumferential cut and a plurality of enlarged undercut circumferential recesses located one adjacent each of the said cutters, and adapted to receive metal removed by the said cutters.

2. A broach having a plurality of cutters arranged in different transverse planes each adapted to form a cut throughout less than its whole circumference, and to have supporting engagement with the bearing metal throughout the remainder of its circumference, and each cutter having its effective cutting edge staggered angularly in relation to the next adjacent cutter.

3. A broach having a plurality of cutters arranged in different transverse planes, said cutters having substantially continuous cutting edges of progressively increasing circumferential length from the first to the last.

4. A broach having a plurality of cutters arranged in separate transverse planes, each cutter having several effective cutting edges separated by circumferentially extending supporting surfaces adapted to engage the bearing metal at points between the said cutting edges.

In testimony whereof, I hereunto affix my signature.

H. C. HOOK.